July 3, 1962 R. C. BRAY ETAL 3,041,769
SIGNALLING FISH ROD HOLDER
Filed Sept. 15, 1960

Ray C. Bray
Virgil J. Remillard
INVENTORS

United States Patent Office 3,041,769
Patented July 3, 1962

3,041,769
SIGNALLING FISH ROD HOLDER
Ray C. Bray, 4714 NE. 22nd Ave., Portland, Oreg., and Virgil J. Remillard, P.O. Box 303, Sherwood, Oreg.
Filed Sept. 15, 1960, Ser. No. 56,219
3 Claims. (Cl. 43—17)

This invention relates to a signalling fish rod holder.

A principal object of the present invention is to provide a novel combination of fish rod holder and signalling means whereby there is accomplished an efficient actuation of the signalling means upon a predetermined force being applied to the fish rod.

More particularly, it is an object to provide a signalling fish rod holder employing means mechanically connecting the fish rod with alarm actuating means, thus insuring positive and efficient signalling by the alarm means.

Another object is to provide a signalling fish rod holder employing means for sounding an alarm at a remote station.

A further object is to provide a signalling fish rod holder having improved means for adjusting the sensitivity of operation of electric alarm means.

Still other objects are to provide a signalling fish rod holder which supports the rod in an efficient alarm actuating but quickly detachable position; which is adaptable for use either on shore or on a boat; and which is simple in construction and inexpensive to manufacture.

Briefly stated, the device of the present invention employs a casing having fish rod holding means as a part thereof. This casing is pivotally mounted on a stationary supporting member with such pivotal movement being controlled by resilient means disposed between the casing and the supporting member. Operatively mounted on the casing and the supporting member are switch means and switch operating means whereby upon relative movement between the casing and the supporting member, the switch means is caused to actuate an alarm. The present invention also incorporates means for locating the alarm at a station remote from the holder.

The invention will be better understood and additional objects will become apparent from the following specification and claims considered together with the accompanying drawings, wherein the numerals of reference indicate like parts and wherein:

Figures 1, 2, 3:
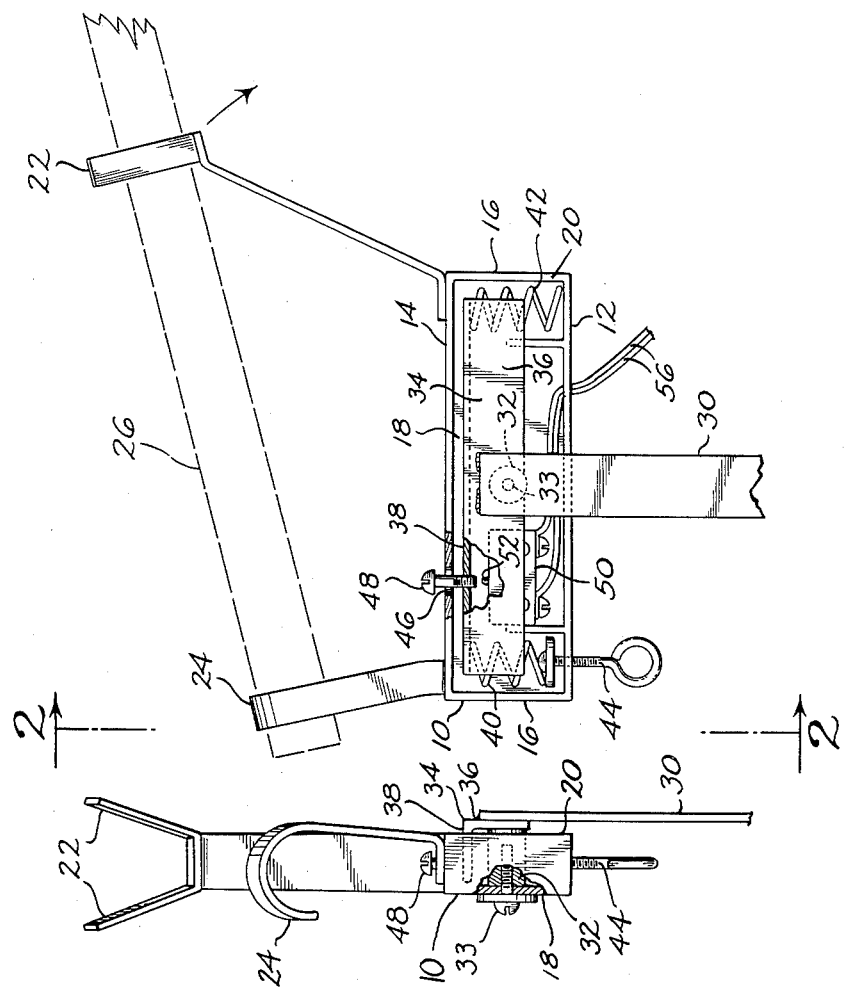
FIG. 1 is a side elevational view, partly broken away, of the fish rod holder of the present invention.
FIG. 2 is an end elevational view taken on the line 2—2 of FIG. 1.
FIG. 3 is a wiring diagram of the electric signalling means.

With particular reference to the drawings the device of the present invention employs a casing 10 which in a preferred arrangement assumes a box-like structure having a bottom wall 12, a top wall 14, end walls 16, a closed side wall 18 and an open side wall 20. Integrally supported on the casing 10 such as on the top wall 14 are rod holding means comprising a cradle 22 at the forward end and an inverted U-shaped hook 24 at the rearward end, whereby the handle 26 of a fishing rod is adapted to be securely mounted in but quickly detachable from the holder.

Casing 10 is pivotally supported on a post or standard 30 by means of a transverse shaft 32 on the post, the wall 18 having a bearing engagement with the end of shaft 32 and being connected to the shaft by a screw 33. By means of the connection between the casing and the support 30, the latter is capable of longitudinal tilting. Post 30 may comprise a ground engaging member for supporting the holder on the shore or may be associated with clamp means for mounting the holder on a boat.

Post 30 is integrally connected to an angle bar 34 having a vertical wall 36 connected to the post and a horizontal wall 38 projecting into the casing 10. Engageable between the horizontal wall 38 and the bottom wall 12 of casing 10 adjacent the rearward and forward ends of the casing are compression springs 40 and 42, respectively, which operate to provide resilient resistance to rotation of casing 10 relative to the stationary angle bar 34 and therefore to the post 30.

Rear spring 40 is engaged by an adjusting screw 44 threadedly mounted in the bottom wall 12 of casing 10. It will be apparent that by rotation of screw 44 the compressed condition of the two springs 40 and 42 may be adjusted to control the force necessary to tilt the casing relative to the angle bar 34. That is, with the two springs disposed in engagement with the bar 34 and casing 10 on opposite sides of a central pivot point, adjustment of the compression in the spring 40 will be carried into spring 42 to provide a well-balanced, accurately responsive structure. The setting to be applied is controlled by the intensity of strike desired to sound the alarm, the weight and length of rod employed, the roughness of water, the amount of weight employed on the fish line, and other factors.

Threadedly mounted in vertical relation in the horizontal wall portion 38 of angle bar 34 and freely projecting through an enlarged opening 46 in top wall 14 of casing 10 is a screw 48. This screw comprises a switch operating member for a micro-switch 50 securely attached to casing 10. Switch 50 has a switch element 52 disposed in alignment with the screw whereby upon clockwise rotation of the casing, FIG. 1, as when a fish exerts a downward pull on the end of the rod, the switch element 52 moves upwardly into engagement with screw 48 to close the switch. Threaded adjustment of the screw 48 may be made to vary the space between the bottom end thereof and the switch element to control the amount of relative rotation between the members necessary to close the switch.

Micro-switch 50 controls the operation of alarm signalling means 54 which may be disposed at a station remote from the holder, and for this purpose a pair of wires 56 lead from the switch 50 to the alarm 54, one of the wires being connected to a source 58 of electrical energy such as a dry cell, as apparent from the wiring diagram of FIG. 3.

In operation of the present holder, a fish rod is mounted on the holder by engagement of the handle 26 of the rod with the cradle 22 and hook 24. Setting may then be accomplished of spring adjustment screw 44 and switch actuating screw 48 to control respectively the resilient resistance to pivotal movement of casing 10 and the extent of such pivotal movement necessary to close the switch. Such adjustments are operative to regulate the intensity of strike required to sound the alarm, and of course the other factors which influence its operation in readiness for such strike as mentioned above.

When a fish strikes, the force on the fish line pulls the end of the fish rod downwardly to rotate the casing 10 clockwise as viewed in FIG. 1 whereby the micro-switch 50 moves with the casing to cause engagement of switch element 52 with stationary actuating screw 48, thus closing the circuit and sounding the alarm.

It will thereby be apparent that the present fish rod holder, by its construction, is compact in structure and comprises an arrangement providing accurate and efficient operation both as a fish rod holder and as means signalling the strike of a fish. By means of the arrangement described the alarm means may be disposed at a station remote from that of the holder so that constant attention by the fisherman at the holder is not necessary.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A signalling fish rod holder comprising a stationary support, a casing pivotally mounted on the support and enclosing a portion of the latter, resilient means interiorly of the casing disposed engageably between the casing and an enclosed portion of the support, the resilient means resisting relative rotation of the casing and support, fish rod holding means on the casing adapted to pivot the casing relative to the support against the action of the resilient means when a fish pulls on the fish line, a signalling device, and a pair of switch elements one on each of the casing and stationary support and adapted to engage each other upon pivotal movement of the casing, the switch elements being operatively connected with the signalling device for causing actuation of the latter upon inter-engagement of the switch elements.

2. The signalling fish rod holder of claim 1 wherein the casing and enclosed portion of the stationary support are elongated and wherein the resilient means comprise a pair of spaced coil springs disposed adjacent opposite ends of the casing.

3. The signalling fish rod holder of claim 2 including adjustment means engageable with one of the coil springs to adjust the force thereof and vary the intensity of pull necessary to pivot the casing relative to the stationary support.

References Cited in the file of this patent

UNITED STATES PATENTS

| | | |
|---|---|---|
| 2,745,088 | Bauer | May 8, 1956 |
| 2,784,517 | Mooney | Mar. 12, 1957 |
| 2,816,388 | Hartley | Dec. 17, 1957 |
| 2,817,176 | Harshbarger | Dec. 24, 1957 |
| 2,909,860 | Braun | Oct. 27, 1959 |